US00RE37791E

(19) United States
(12) Reissued Patent
Yokouchi

(10) Patent Number: US RE37,791 E
(45) **Date of Reissued Patent: *Jul. 16, 2002**

(54) DISK DRIVING MOTOR AND CHUCKING MECHANISM FOR DISK DRIVE APPARATUS

(75) Inventor: Hideya Yokouchi, Okaya (JP)

(73) Assignee: Seiko Epson Corporation, Tokyo (JP)

( * ) Notice: This patent is subject to a terminal disclaimer.

(21) Appl. No.: 09/201,429

(22) Filed: Nov. 30, 1998

Related U.S. Patent Documents

Reissue of:
(64) Patent No.: 5,581,423
Issued: Dec. 3, 1996
Appl. No.: 08/233,890
Filed: Apr. 26, 1994

U.S. Applications:

(63) Continuation-in-part of application No. 07/894,839, filed on Jun. 8, 1992, now Pat. No. 5,311,383.

(30) Foreign Application Priority Data

Jun. 24, 1991 (JP) ..... 3-151524
Jun. 24, 1991 (JP) ..... 3-151525
Apr. 24, 1992 (JP) ..... 4-131553

(51) Int. Cl.[7] ..... G11B 17/02
(52) U.S. Cl. ..... 360/99.08; 360/99.12
(58) Field of Search ..... 360/99.08, 99.12, 360/99.04

(56) References Cited

U.S. PATENT DOCUMENTS 4,378,576 A 3/1983 Roling
4,649,445 A 3/1987 Sheriff
4,697,216 A 9/1987 Tsukahara
4,796,140 A * 1/1989 Wakabayashi et al.
4,896,232 A * 1/1990 Sugawara
4,899,244 A * 2/1990 Morse
5,103,358 A * 4/1992 Munekata
5,138,606 A * 8/1992 Nishizawa
5,151,836 A * 9/1992 Ichihara
5,161,075 A * 11/1992 Kanai et al.
5,303,102 A * 4/1994 Aruga et al.
5,303,104 A * 4/1994 Aruga et al.
5,469,421 A * 11/1995 Aruga et al.

FOREIGN PATENT DOCUMENTS

EP 0 183 529 A2 * 6/1986
JP 61-52351 * 4/1986
JP 62-273686 * 11/1987
JP 4-38751 * 2/1992
JP 4-117661 * 4/1992
JP 4-178959 * 6/1992
JP 4-178960 * 6/1992
JP 4-188458 * 7/1992
JP 5-282757 * 10/1993

* cited by examiner

*Primary Examiner*—Thomas E. Denion
(74) *Attorney, Agent, or Firm*—Oliff & Berridge, PLC

(57) ABSTRACT

A disk drive apparatus includes a spindle for engagement with a central hole of a disk hub of a magnetic disk, a rotary member fixed to the spindle, a chucking magnet provided on the rotary member for attracting the disk hub, and a chucking lever pivotally provided on the rotary member which comes at its one end into engagement with a drive hole formed in the disk hub to rotate the disk. When the chucking lever is not chucking the disk, the chucking lever is pivotal about its pivot support point within a given angle, but its movement in the axial direction of the spindle is prevented. The pivot support point section is provided with a disengagement preventive lever which acts in relation to the rotary member to prevent the chucking lever from disengaging from the rotary member.

56 Claims, 16 Drawing Sheets

DISK DRIVING MOTOR AND CHUCKING MECHANISM FOR DISK DRIVE APPARATUS

Matter enclosed in heavy brackets [ ] appears in the original patent but forms no part of this reissue specification; matter printed in italics indicates the additions made by reissue.

CROSS-REFERENCE TO RELATED APPLICATIONS AND PATENTS

This is a Continuation-in-Part of application Ser. No. 07/894,839, filed Jun. 8, 1992, now U.S. Pat. No. 5,311,383.

This application is related to U.S. Pat. No. 5,303,102 entitled Disk Drive Apparatus Having Head Guard, to Tomoe Aruga et al and U.S. Pat. No. 5,303,104 entitled Disk Drive Apparatus Having Carriage Driving Mechanism to Tomoe Aruga et al. These applications and patents are incorporated herein by reference.

BACKGROUND OF THE INVENTION

1. Field of the Invention

This invention relates to a disk drive apparatus for recording and reproducing information in and out of a floppy disk or the like, and more particularly, to a disk driving motor and chucking mechanism for a disk drive apparatus.

2. Description of Related Art

A disk driving motor assembly generally includes a disk chucking mechanism, and rotates a disk (held on a rotary member of the motor assembly by the chucking mechanism) together with the rotary member. Disk chucking mechanisms have been proposed in various forms. See, for example, Japanese Laid-Open Utility Model No. 61-52351.

FIGS. 11–14 show one such conventional disk driving motor assembly including a chucking mechanism. FIG. 11 is a vertical sectional view showing an example of a conventional disk driving motor assembly including a chucking mechanism. FIG. 12 is an overhead plan view showing the disk chucking mechanism. FIG. 13 is a bottom view of the disk chucking mechanism. FIG. 14 is a schematic sectional view showing a drive pin section of the disk chucking mechanism.

In these drawings, 501 is a disk, 502 is a disk hub, and 503 is a spindle of the disk driving motor. A chucking lever 508 is pivotally attached, via a support point 516, to a rotary member 504, which is rotatable together with the spindle 503. A spring 514 is provided at support point [506] *516* to urge a drive pin 505 attached to the chucking lever 508 in the axial direction of the drive pin. Another spring 515 (see FIG. 12) is provided between rotary member 504 and chucking lever 508 to exert an urging force on lever 508 in the circumferential direction of the motor.

When the disk hub 502 is to be chucked (e.g., when it is initially set in place), the chucking lever 508 is pivoted at the support point 516 because one end of it is pushed downwardly by the disk hub 502 as shown in FIG. 14 with the result being that the chucking lever 508 deflects in the direction of the arrow r. Once spindle 503 (and thus rotary member 504 and chucking lever 506) are rotated, disk hub 502 continues to press the one end of lever 508 downward until a drive hole 502b formed in the disk hub 502 (in offset relation to the center thereof) comes into alignment with the drive pin 505 (see FIG. 11).

When a rotor 511 of a spindle motor 510, which is attached to one end of the spindle 503 (as shown in FIG. 11) begins rotating, the drive pin 505 also rotates together with the spindle 503. When the drive hole 502b comes into alignment with the drive pin 505, the drive pin 505 is urged into the drive hole 502b in disk hub 502 by virtue of the pushing force of spring 514.

Consequently, because of the positional relationship between the drive pin 505 and the support point 516, rotation of spindle 503 causes drive pin 505 to exert a force in the direction of the arrow s as shown in FIG. 12 to cause rotation of disk hub 502. Among these forces, the force in the direction of the arrow s acts to press two points along the inner edge of a central hole 502a of the disk hub 502 against the spindle 503, so that the disk hub 502 is rotated while also being centered.

As shown in FIG. 11, a first magnetic head 512 for recording and reproducing an information signal into and out of the disk 501 is disposed on a first carriage 517 between a frame 513 of the spindle motor 510 and the disk 501. A second magnetic head 507 is also provided to engage an opposite side of disk 501.

In the foregoing conventional configuration, however, it is difficult to decrease the thickness of the overall disk drive apparatus because its thickness is determined by the rotor 511 of the spindle motor 510, first carriage 517, first magnetic head 512, the space required for the disk chucking mechanism, etc.

One limitation in reducing the thickness of the disk drive apparatus is caused by the need to provide sufficient space below the drive pin 505 so that the drive pin 505 may retract in the direction of the arrow r as shown in FIG. 14 when the drive pin 505 is pushed by the disk hub 502 (before the disk hub 502 is chucked).

Further, to attach the rotary member of the rotor of the disk driving motor to the spindle, conventionally, as shown in FIG. 11, the rotary member 504 is tightly fitted to the spindle 503 using a bushing 518. Additionally, the rotor 511 is press-fitted to the spindle 503 by forming a cylindrical boss portion 511a integrally with the rotor. As another alternative, shown in FIG. 15, a rotor 521 is fitted to a bushing 522 which is in turn press-fitted to a spindle 523. In FIG. 15, 524 is a drive magnet, 525 is a drive coil, 526 is a motor base, 527 is a circuit board, and 528 is a bearing fitted to the motor base 526.

In the foregoing conventional configurations, however, in order to reduce the swinging (wobble) of the rotary member, or of the rotor relative to the spindle, the fitting section between the spindle and the boss portion 511a or the bushing 518 or 522 must have a certain axial length, this also making it difficult to decrease the thickness of the disk drive apparatus.

U.S. Pat. No. 4,697,216 to Tsukahara discloses a disk drive apparatus in which a yoke plate and a turntable form a two-piece rotary member. A ring plate, which forms a disk chucking mechanism and includes a drive pin, is located between opposed surfaces of the turntable and the yoke plate, and is pivotally attached to the yoke plate. A magnet plate 36 is provided over the yoke plate for attracting the metal hub of a disk. The opposed surfaces of the turntable and the yoke plate prevent the ring plate from moving in an axial direction of a motor shaft, which is attached to the yoke plate and causes the turntable and yoke plate to rotate. However, this structure is bulky because the turntable and the yoke plate both cover the entirety of both surfaces of the ring plate so as to clamp the ring plate between the turntable and the yoke plate, in order to prevent the ring plate from moving in the axial direction of the motor shaft.

OBJECT AND SUMMARY OF THE INVENTION

It is an object of the present invention to simplify the configuration of a disk driving motor assembly which includes a disk chucking mechanism, and to decrease the thickness of the disk driving motor assembly as much as possible, thereby making a disk drive apparatus thinner.

To accomplish the foregoing and other objects, and to overcome the shortcomings set forth above, the present invention provides a disk drive apparatus that comprises a spindle for engagement with a central hole of a disk hub made of metal or the like which is provided in a central portion of a disk accommodated in a cartridge. A rotary member such as, for example, a rotor is fixed to the spindle. A chucking magnet is provided on the rotary member for magnetically attracting the disk hub. A chucking lever is pivotally provided on the rotary member, which has a drive pin near one end that comes into engagement with a drive hole (generally of substantially quadrangular shape formed in the disk hub in offset relation to the center thereof) to engage and rotate the disk. When the chucking lever is not chucking the disk, the chucking lever is pivotal about a support point within a given angle in the radial direction of the motor, spindle and disk, but its shifting in the axial direction of the spindle is restricted (prevented). A support point section of the chucking lever is provided with a disengagement preventive mechanism that acts in relaxation to the rotary member to prevent disengagement of the chucking lever from the rotary member.

As will be appreciated, since the chucking lever is pivotal about its support point within a given angle but its shifting in the axial direction of the spindle is prevented, the thickness of the disk drive apparatus can be decreased.

According to one aspect of the invention, the rotary member includes a slot, and the chucking lever permanently protrudes into the slot so that edges of the slot limit movement of the chucking lever in a direction perpendicular to an axial direction of the spindle.

According to another aspect of the invention, the chucking lever is provided on a surface of the rotary member that faces away from a disk, and the drive pin of the chucking lever extends through a hole in the rotary member, which limits movement of the chucking lever in the direction perpendicular to the spindle axial direction.

The disclosed structures prevent the chucking lever from moving in the axial direction of the spindle without requiring a separate clamp that extends over substantially the entire surface of the chucking lever. That is, the rotary member extends over substantially the entirety of only one side of the chucking lever, substantially the entirety of the opposite side of the chucking lever is not covered by any structure that prevents the chucking lever from moving in the spindle axial direction.

According to another aspect of the invention, the drive pin is made from plastic to reduce wear on the disk hubs of disks used with the disk drive apparatus.

Preferably, a rotor of a spindle motor for rotating the disk may be used as the foregoing rotary member.

In the case of the spindle motor, a circumferential groove may be formed in the spindle, a snap ring fitted in the circumferential groove, and the rotor press-fitted to the spindle and fixed onto the snap ring. The snap ring stably supports the rotor, preventing wobble, and securely holds the rotor so that it extends perpendicular to the axis-of the spindle, while reducing the length of contact between the rotor (and other rotor securement structure) and the spindle in the axial direction of the spindle.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

A disk drive apparatus according to the present invention will now be described with reference to the drawings.

Figure 1:
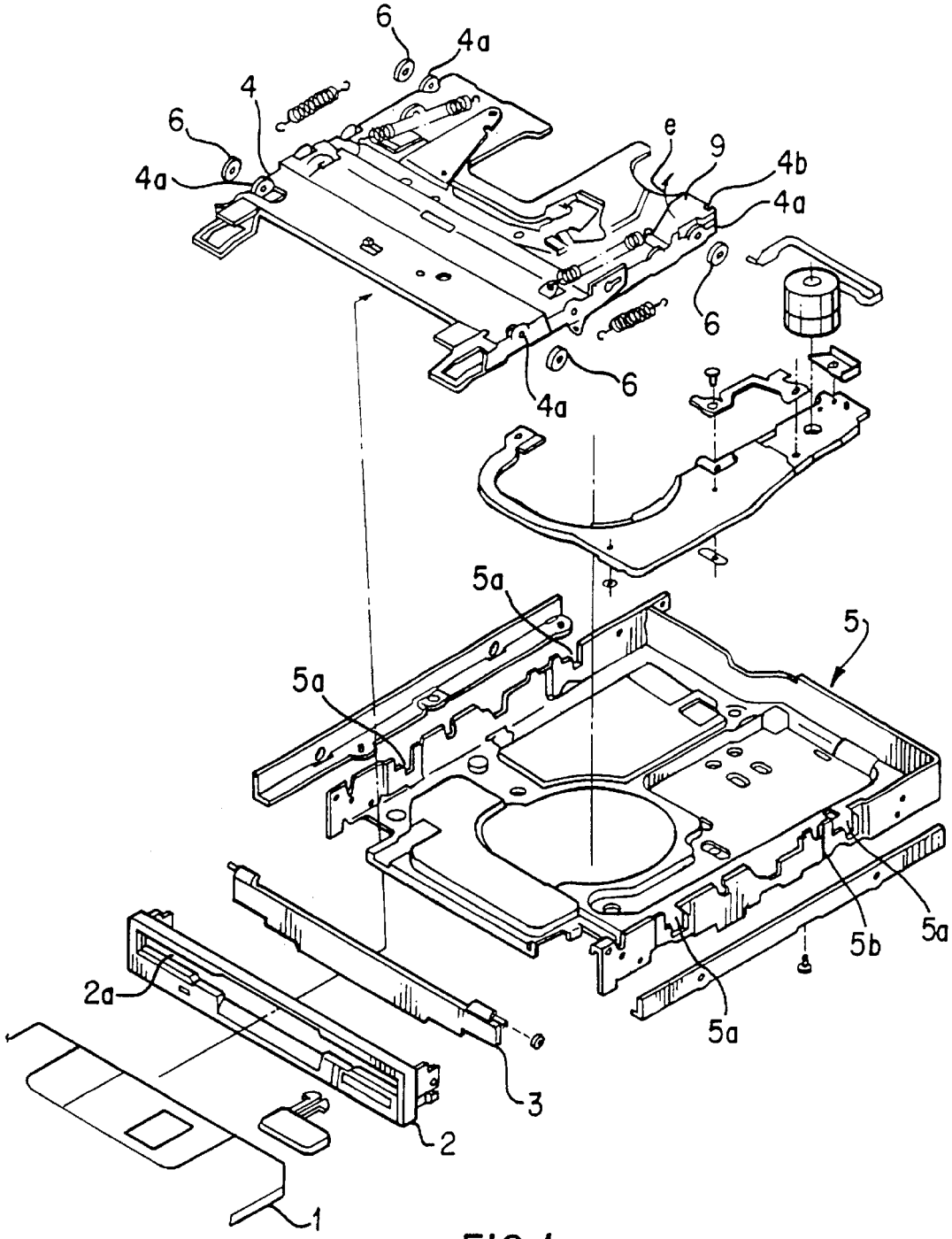
FIG. 1 is a fragmentary exploded perspective view showing an illustrative embodiment of a disk drive apparatus according to the present invention.
Figure 2:
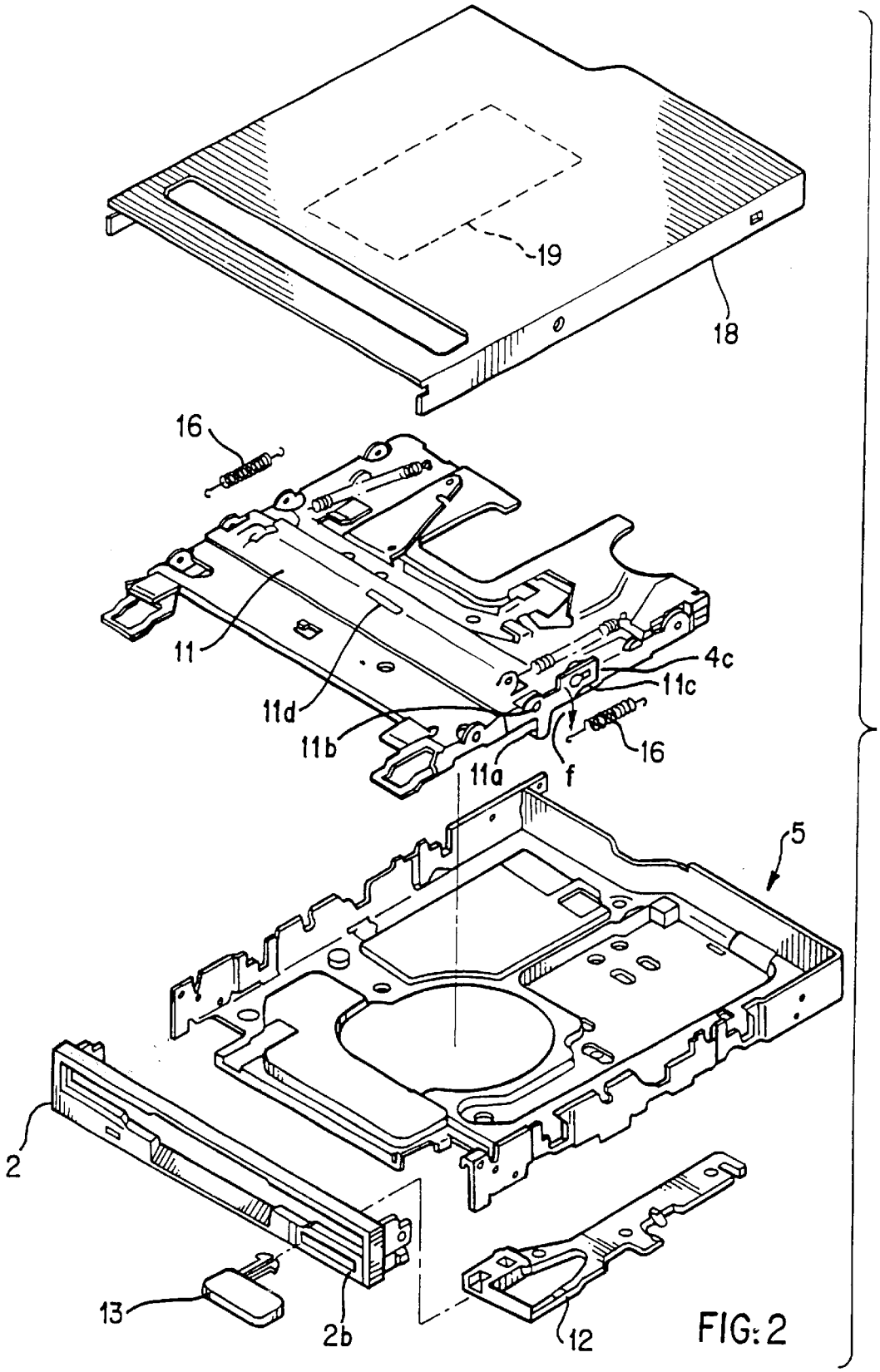
FIG. 2 is another fragmentary exploded perspective view showing the embodiment of FIG. 1.

FIGS. 1 and 2 are exploded perspective views showing an embodiment of the disk drive apparatus according to the present invention. In FIG. 1, reference numeral 1 designates a jacket (or cartridge) in which a disk is accommodated. The cartridge 1 is injected through an opening 2a of a front bezel 2 into a holder 4 while pressing a bezel shutter 3 against a spring bias which usually maintains shutter 3 closed.

The holder 4 holds the inserted cartridge 1, and is supported on a lower shield casing 5 so as to selectively move between an eject position and a recording/reproducing position defined for the cartridge 1. The holder 4 has four guide rollers 6 rotatably attached to four projected portions 4a located along the side edge thereof. Guide rollers 6 are received in four guide grooves 5a formed in the lower shield casing 5.

Figure 3:
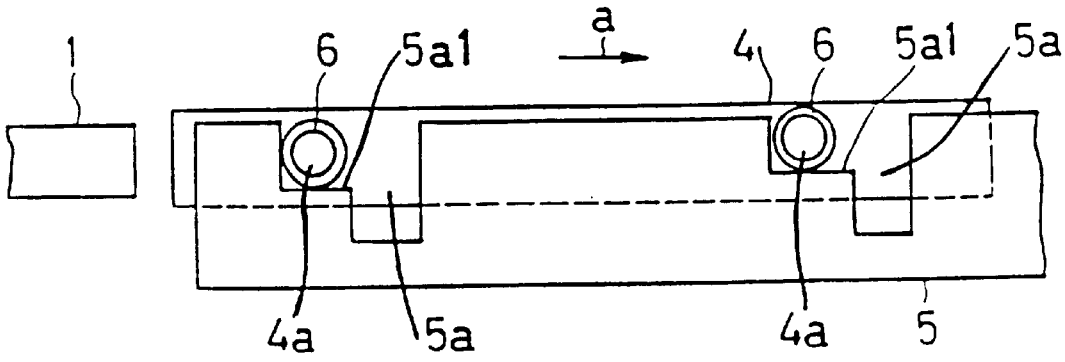
FIG. 3 is a schematic side view showing a disk holder of the embodiment of FIG. 1.

The shifting of holder 4 between the recording/reproducing position and the eject position will be described with reference to the schematic side views of FIGS. 3 and 4. Before cartridge 1 is placed in holder 4, as shown in FIG. 3, the projected portions 4a of the holder 4 lay on receiver portions 5a1 of guide grooves 5a. Each guide roller 6 is attached to the corresponding projected portion 4a for the purpose of reducing sliding-resistance between portions 4a and grooves 5a.

Figure 4:
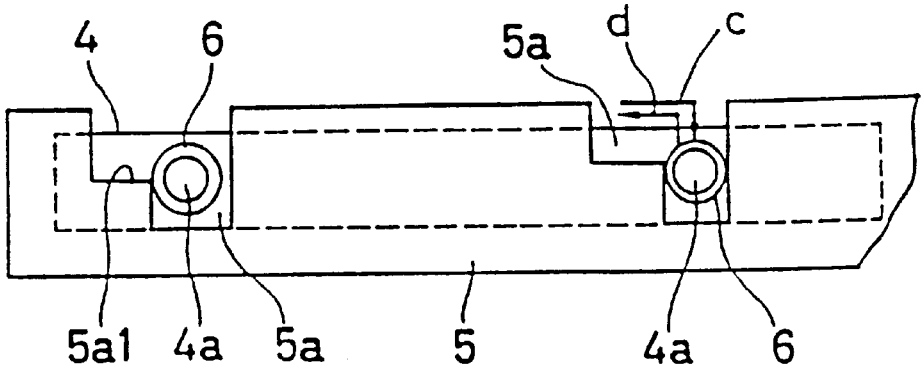
FIG. 4 is a schematic side view showing the disk holder after it has moved into a position where the disk is in a recording/reproducing position.

When cartridge 1 is inserted into the holder 4, and the holder 4 is shifted in the direction of the arrow a as shown in FIG. 3, the projected portions 4a of the holder 4 move off the receiver portions 5a1 of the guide grooves 5a and shift in the direction of the arrow c as shown in FIG. 4. Consequently, the cartridge 1 held in the holder 4 is placed in the position for recording/reproducing.

To prevent the holder 4 from shifting in the direction of the arrow a as shown in FIG. 3, or to prevent the guide rollers 6 from coming off the receive portions 5a1 of the guide grooves 5a when no cartridge 1 is located in holder 4, or when in the eject position (even upon shock or the like), a trigger 9 is pivotally attached, via a support point 4b, to the holder 4 as shown in FIG. 1. Trigger 9 prevents shifting of the holder 4 after its one end (opposite from the end attached to support point 4b) comes into engagement with a stopper portion 5b of the lower shield casing 5.

When the cartridge 1 is inserted into the holder 4, the trigger 9 in engagement with the stopper portion 5b of the lower shield casing 5 turns in the direction of the arrow e as shown in FIG. 1. In particular, a leading edge of cartridge 1 contacts a lower portion (not shown) of trigger 9 so as to cause trigger 9 to rotate in the direction of arrow e. As a result of pivotal movement of trigger 9, the trigger comes out of engagement with the stopper portion 5b of the lower shield casing 5. Thus, upon further movement of cartridge 1, the holder 4 and the cartridge 1 can be set to the position for recording/reproducing as shown in FIG. 4.

The ejection of the cartridge 1 will now be described. In FIG. 2, a push portion 11a of a lifter 11 passes through a hole formed in the lower shield casing 5 and projects from the lower surface of the lower shield casing 5 so as to be in engagement with an eject arm 12. Lifter is pivotally mounted to lower shield casing at projected portion 11b thereof. An eject button 13 is coupled to the eject arm 12. When the eject button 13 is pushed, the push portion 11a of the lifter 11 is pushed by means of the eject arm 12, and the lifter 11 turns around projected portion 11b, so that a lift portion 11c of the lifter 11 and a lift pin 4c of the holder 4 (which is engaged with lift portion 11c) are lifted up. As a result, the holder 4 moves up, and the guide rollers 6 ride on the receiver portions 5a1 of the guide grooves 5a of the lower shield casing 5 and shift in the direction of the arrow d as shown in FIG. 4, so that the cartridge 1 is ejected.

The lifter 11 has a lifter spring 16 coupled between lifter 11 and the lower shield casing 5 so that the lifter 11 is always urged so as to turn in the direction of the arrow f as shown in FIG. 2. Therefore, when the cartridge 1 is inserted as described above, causing holder 4 to move in the direction of arrow a in FIG. 3, lifter spring 16 urges lifter in the direction of arrow f, causing lift portion 11c and lift pin 4c to move downward so that the holder 4 can shift to the position for recording/reproducing.

Further, in FIG. 2, the eject button 13 is made so that it has an external size smaller than a button hole [2a] *2b* formed in the front bezel 2. The eject arm 12 and the eject button 13 are coupled together in a snap-fit manner. Therefore, the eject button 13 can be attached to eject arm 12 after attaching the front bezel 2 to the lower shield casing 5. Button hole [2a] *2b* is used as a guide for attaching button 13 to arm 12. Accordingly, any eject button which is made thinner and is more difficult to handle in compliance with a demand for a size/thickness reduction can readily be attached. Even if the specifications of the disk drive apparatus are changed, a new eject button can be substituted without removing the front bezel.

To prevent invasion of noise, dust and damage (via physical intrusions) to the inside of the disk drive apparatus due to rough handling, a shield casing 18 is attached to the upper surface of the lower shield casing 5. A runner sheet 19 is bonded to the inner surface of the shield casing 18 and functions as a slide member for reducing sliding-resistance and securing insulation. The runner sheet 19 is provided to make the sliding of an upper carriage (which holds an upper magnetic head) easy, decrease the friction between the shield casing 18 and the lifter 11, and attain load reduction. Further, the lifter 11 has a receive protrusion 11d which bears the load arising when an external force is applied to the shield casting 18, thereby preventing deformation of the shield casing 18. Thus, the shield casing 18 can be thin, and made from a light weight material such as aluminum. Even if the shield casing 18 and the receive protrusion 11d rub together, the runner sheet 19 of low friction prevents malfunctions due to rubbing.

A disk driving motor assembly for rotating the disk and a disk chucking mechanism for holding said disk while the motor is rotating, in accordance with a preferred embodiment of the present invention, will now be described.

Figure 5:
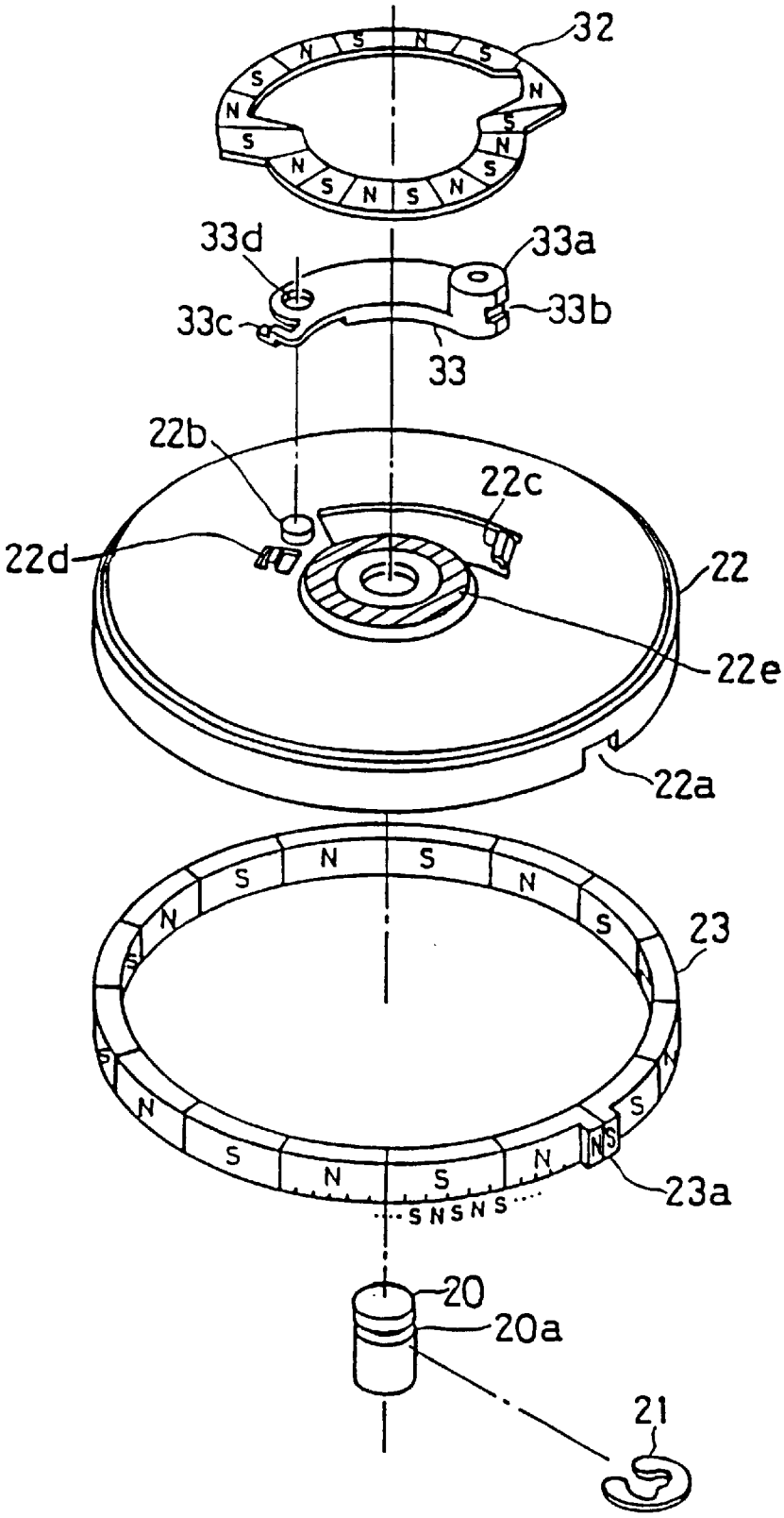
FIG. 5 is a fragmentary exploded perspective view showing the rotor and chucking mechanism of a disk driving motor assembly of the embodiment of FIG. 1.
Figure 6:
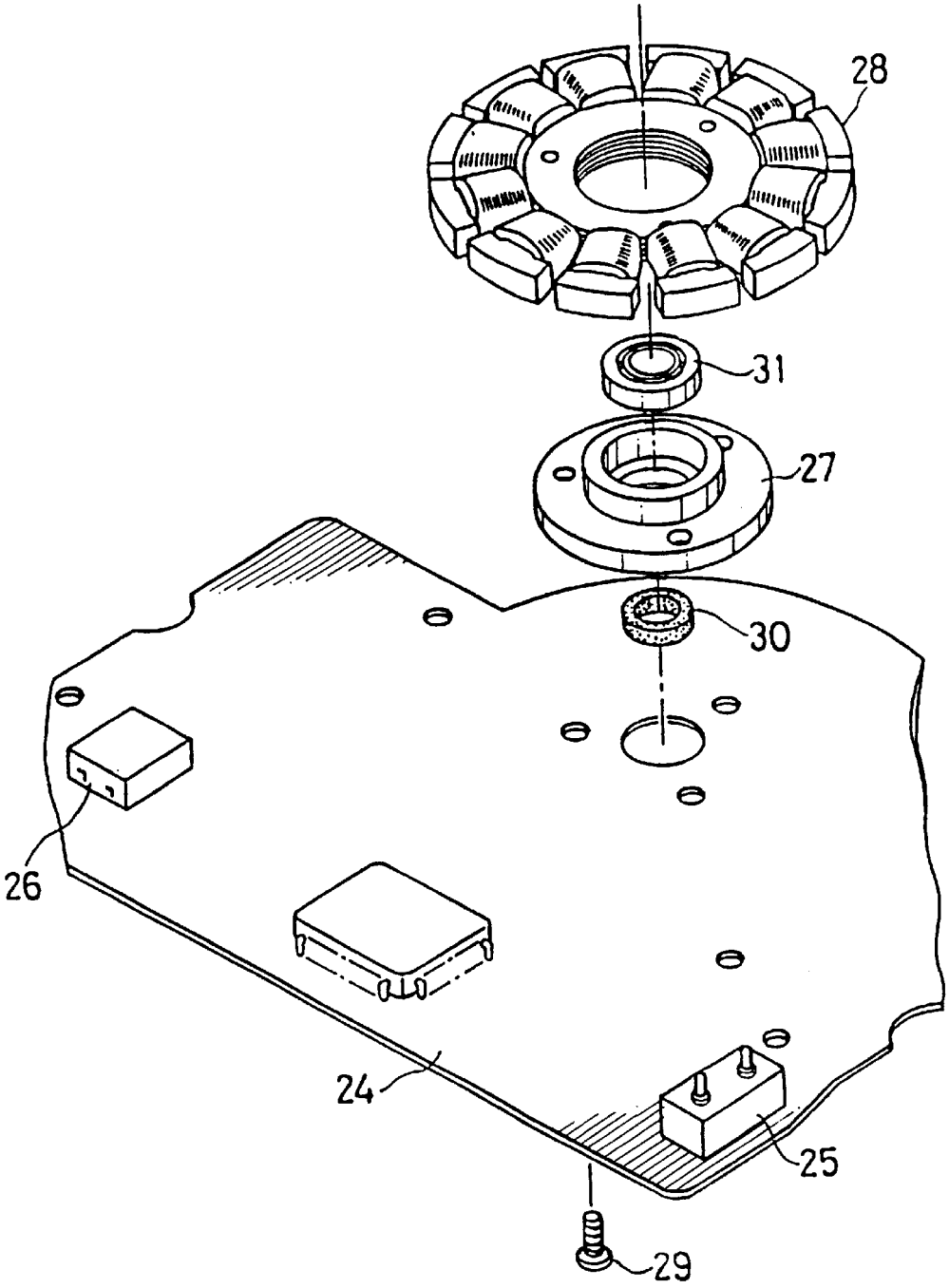
FIG. 6 is a fragmentary exploded perspective view showing the motor circuit board and stator of the disk driving motor assembly.

FIGS. 5 and 6 are exploded perspective views showing a preferred embodiment of a disk driving motor assembly according to the present invention. The embodiment uses a spindle motor, and the disk chucking mechanism is provided on the rotor of the spindle motor.

In FIG. 5, reference numeral 20 designates a spindle which comes into engagement with a central hole of a metallic disk hub (such as hub 10a in FIG. 9), which is bonded or fixed to the center of the disk accommodated in the cartridge, so as to center the disk. The spindle 20 is press-fitted to a rotor 22 of the spindle motor for rotating the disk.

In order to address the recent demand for thickness reduction in the field of computers, the thickness of the disk drive apparatus has been progressively reduced. In view of such demand, it is a common understanding of those concerned with design of disk drive apparatus that the demand for reducing the thickness of the spindle motor used in disk drive apparatus is very high. In view of these circumstances, the thickness of the rotor 22 of the spindle motor of the present invention is made as thin as possible in design, and thus, the preferred embodiment uses an iron plate having a thickness of 0.5 mm. However, if such a thin iron plate is press-fitted to the spindle 20, it is impossible to suppress the horizontal swinging (wobble) of the rotor 22 relative to the spindle 20 to be within a required level of stability because the axial length (relative to spindle 20) of such a fitting section is short. That is, it is difficult to secure the rotor 22 to the spindle 20 so that the rotor extends in a plane perpendicular to the longitudinal axis of spindle 20.

To overcome this problem, the spindle 20 is formed with a groove 20a in which an E-shaped snap ring 21 is fitted. Since the groove 20a is machined by a lathe or the like, the swinging of clip 21 relative to the spindle 20 can be suppressed sufficiently so as to be very small. Further, since press-fitting of rotor 22 on spindle 20 is performed until the rotor 22 comes into tight contact with the E-shaped snap ring, the rotor 22 can be set with a precision corresponding to the swinging precision of the groove 20a if the thickness of the E-shaped snap ring is uniform.

Accordingly, since it is possible to secure such a high degree of swinging precision, the upper surface of the rotor 22 can be used as a surface for directly receiving (contacting) and stabilizing the disk hub, whereby good contact can be secured between the disk and a recording/reproducing head.

Although the illustrative embodiment uses the E-shaped snap ring 21, the same effects as above can be obtained by the use of a C-shaped or other shaped snap ring.

A rotor magnet 23 attached to the rotor 22 for generation of the motor torque has one projected portion 23a along the circumference thereof. The projected portion is aligned with a notch 22a of the rotor 22, and is magnetized so as to exhibit two poles. Accordingly, during one revolution of the motor, one signal (called an index signal) can be generated by a magnetic sensor (not shown) which senses projected portion 23a.

It is preferable to provide the projected portion 23a with two poles as shown in FIG. 5 to prevent the index signal from changing over time due to the effects of temperature and electric fields thereon. Additionally, because the two poles of projected portion 23a are located such that they are in phase with the driving poles located along the inner surface of rotor magnet 23, a stronger magnetic force can be obtained from projected portion 23a. For example, if the two-poled projected portion 23a was located at the center of one of the pole portions of rotor magnetic 23, the magnetic force provided by projected portion 23a would not be as strong as when the projected portion 23a is located at the boundary between two pole portions of rotor magnet 23 as shown in FIG. 5.

Further, the lower surface (as viewed in FIG. 5) of the rotor magnet 23 (which is opposite to a motor circuit board 24 shown in FIG. 6) is magnetized so as to exhibit a number of poles for speed detection. These poles are illustrated by the S and N notations below rotor magnet 23. This provision for magnetization of the rotor magnet 23 makes effective use of it.

In FIG. 6, a detector switch 25 for detecting that the disk cartridge 1 has been set to the recording/reproducing position and a connector 26 for connection to operation display lamps are attached to the motor circuit board 24. Further, a housing 27 and a stator 28 with coils are fixed in a central portion of the circuit board 24 by three flush screws 29.

The housing 27 has a metal bearing 30 and a ball bearing 31 press-fitted therein. The outer diameter of the ball bearing 31 is larger than the outer diameter of the metal bearing 30 so that a pressure for the side of the ball bearing 31 can be borne by an outer ring of the ball bearing 31. In the embodiment, housing 27 is made of plastic so that the bearing assembly can be press-fitted therein without causing significant deformation, damage, etc. to housing 27, which damage is sometimes caused by press-fitting of bearings. The spindle 20 is inserted into bearings 30 and 31.

The spindle motor is provided with a disk chucking mechanism as briefly described above. A more detailed description of the chucking mechanism will now be provided with reference to FIGS. 5 and 7–10.

The rotor 22 has a chucking magnet 32 bonded to the upper surface thereof, the chucking magnet 32 is formed with an opening through which the upper surface of the rotor can be seen. (That is, chucking magnet 32 is annular and does not cover the entire upper surface of rotor 22.) Disposed in the opening of chucking magnet 32 is a chucking lever 33 which rotates with rotor 22, and centers the magnetic disk after coming into engagement with the drive hole of the disk hub.

The chucking lever 33 is attached to the rotor 22 by means of a pivot support point 22b provided on the rotor 22 around which lever 33 can pivot. A guide portion 22c of the rotor 22 is slidably received in a groove 33b formed in a drive pin portion 33a of the chucking lever 33. Reference numeral 33c designates a disengagement preventive lever portion provided close to a pivot support portion 33d of the chucking lever 33. Disengagement preventive lever portion 33c engages the under side of a disengagement preventive pawl 22d of the rotor 22 so that the pivot support portion 33d is prevented from coming off the pivot support point 22b even upon the application of shock or the like to the disk drive apparatus.

In the illustrated embodiment, the chucking lever 33 is in the form of a single plastic (resin) component, and the disengagement preventive lever portion 33c is shaped so as to reach the under side of the disengagement preventive pawl 22d when assembled. Further, the upper surface of the rotor 22 on which the disk hub is received is provided with a coating 22e which is made of a low friction (slippery) material for the purpose of receiving the disk hub. The coating 22e has a circular shape and is concentric with the spindle 20.

The disk chucking mechanism of the preferred embodiment will be described in greater detail with reference to FIGS. 7, 8 and 9.

Figure 7:
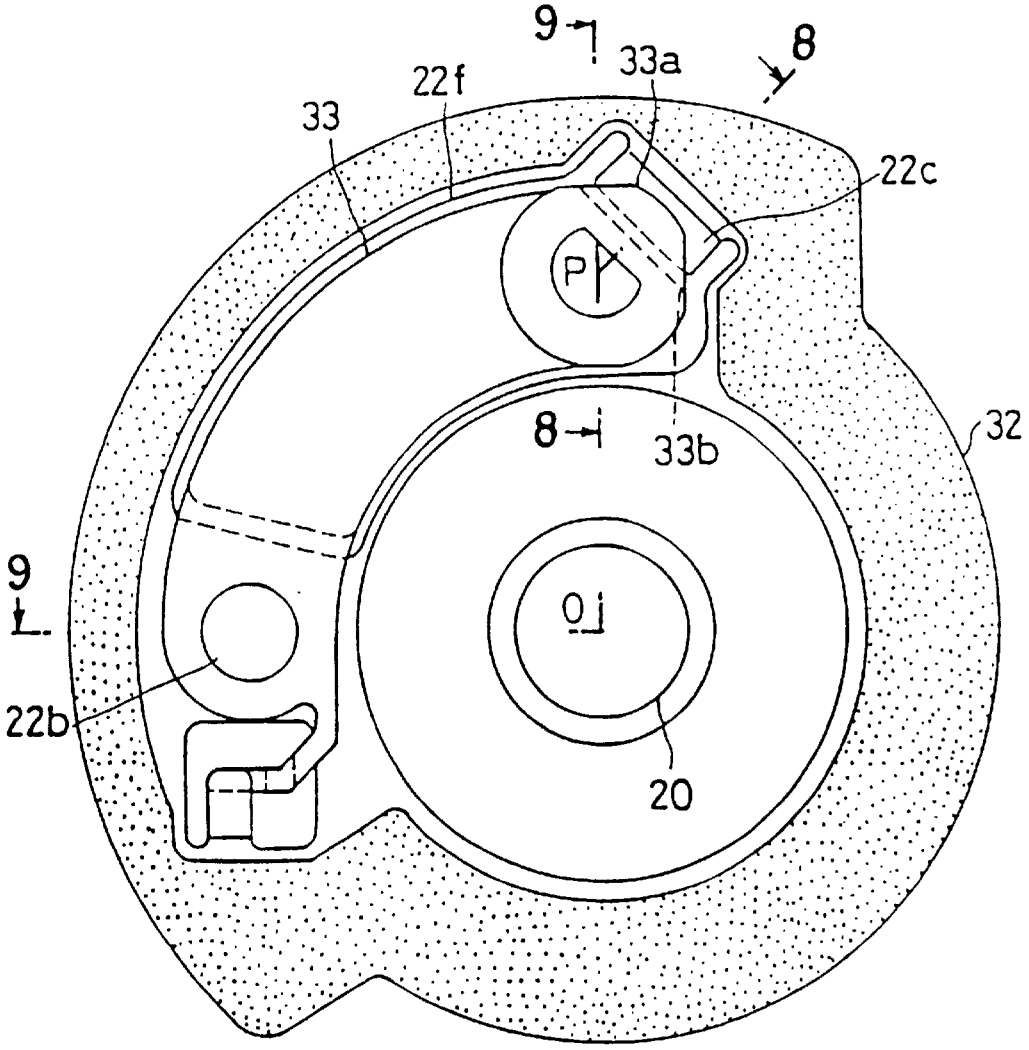
FIG. 7 is an enlarged overhead plan view showing the chucking mechanism of the embodiment of FIG. 5.
Figure 8:
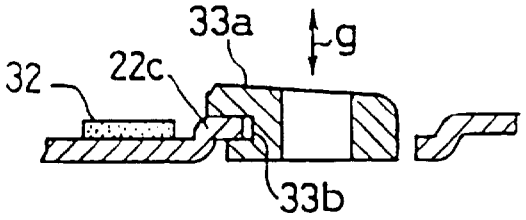
FIG. 8 is a sectional view taken along the line 8-P-8 of FIG. 7.

FIG. 7 is an enlarged plan view showing the chucking mechanism of FIG. 5 assembled to the rotor 22. FIG. 8 is a sectional view taken along the line 8-P-8 of FIG. 7. FIG. 9 is a sectional view taken along line 9-P-O-9 of FIG. 7.

In FIG. 7, a stippled area represents the chucking magnet 32, which is magnetized and shaped such that the force of attracting the disk hub is uniform with respect to the center of the spindle 20. The chucking lever 33 is pivotal about the pivot support point 22b in the radial direction of spindle 20 and disk hub 10a by a predetermined amount within the confines of a hole 22f formed in the rotor 22. However, in the thrust direction of the drive pin portion 33a of the chucking lever 33 (i.e., in the axial direction of spindle 20, represented by the arrow g in FIG. 8), the chucking lever 33 cannot shift because the guide portion 22c of the rotor 22 is in engagement with the groove 33b formed in the drive pin portion 33a of the chucking lever 33 as shown in FIGS. 7 and 8. (As one alternative, a guide portion, or extension, could be formed on drive pin portion 33a, and a groove or other receiving structure formed on rotor 22.)

Because of the foregoing configuration, the following takes place when a magnetic disk cartridge is loaded into the disk drive apparatus. Initially, when the hub 10a of the disk 10 is attracted by the chucking magnet 32 as shown in FIG. 9, if the drive hole of the disk hub 10a is not in alignment with the drive pin portion 33a, the disk hub 10a lays on the upper surface of the drive pin portion 33a in an inclined position. However, the progressive revolution of the spindle motor brings the drive pin portion 33a into alignment with the drive hole of the disk hub 10a, so that the disk 10 is acquired by the chucking mechanism.

Since in the initial unacquired state, the disk hub 10a and the upper surface of the drive pin portion 33a tend to slide and rub together, the upper surface of the drive pin portion 33a is made slightly inclined so as to increase its area in contact with the disk hub 10a. This angle of inclination is preferably 2±1.5 degrees.

It is possible that the disk hub 10a will come into contact with the chucking magnet 32 in such an inclined position. If the chucking magnet 32 is made of a material having a large friction coefficient (such as a rubber magnet), the disk hub 10a will turn together with the chucking magnet 32, with the result being that the drive pin portion 33a cannot come into engagement with the drive hole of the disk hub 10a. Therefore, a low friction (slippery) sheet is bonded to the upper surface of the chucking magnet 32, or a low friction coating is applied thereto. When a nylon-series plastic magnet is used, such a treatment as described above is not required because the plastic itself has a low friction coefficient.

Figure 9:
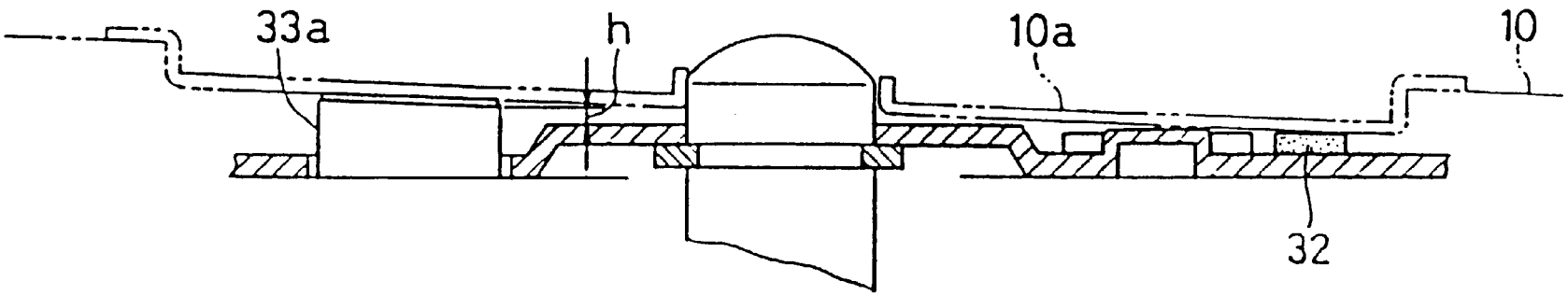
FIG. 9 is a sectional view taken along the line 9-P-O-9 of FIG. 7.

Experiments have shown that to decrease the inclination of the disk hub 10a to thereby attain stable chucking, the length of engagement h between the drive pin portion 33a and the disk hub 10a, as shown in FIG. 9, should preferably be no longer than 0.7 mm.

The foregoing chucking configuration makes effective use of the space of the chucking section. That is, the outer diameter of the rotor of the motor has been decreased down to 40 mm, and the distance from the bottom surface of the motor circuit board to the upper surface of the rotor has been reduced down to 4 mm.

Further, the chucking mechanism needs none of the previously provided separate parts, such as support point members, drive pins and various springs. The chucking lever can be made in the form of a single plastic (resin) component, and the configuration can be simplified remarkably. Thus, the reliability can be enhanced, and the cost can be reduced.

Figure 10:
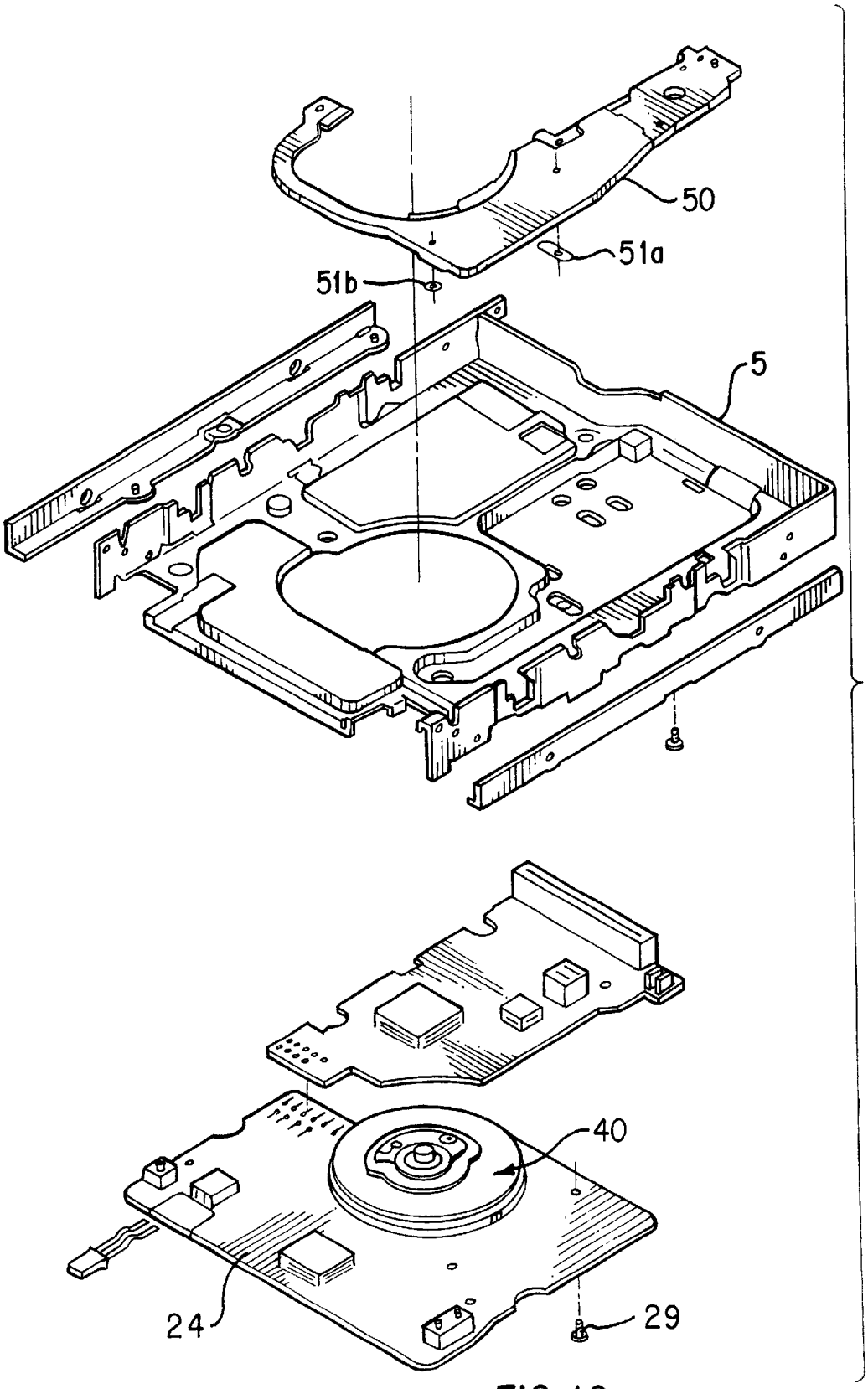
FIG. 10 is an exploded perspective view showing the disk driving motor assembly as it can be attached to a main frame of the disk drive apparatus.
Figure 11:
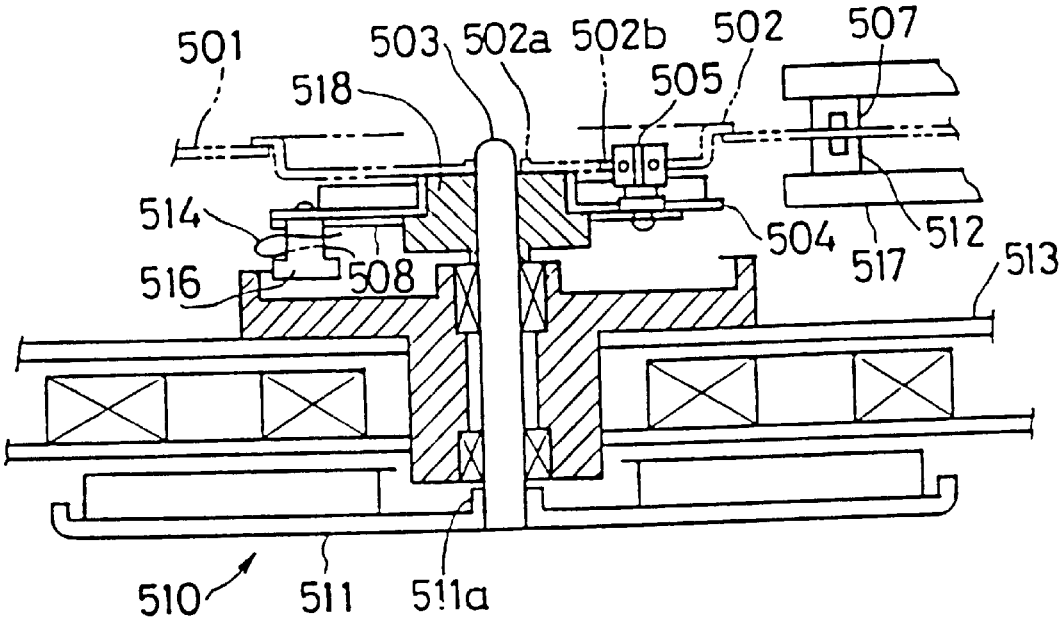
FIG. 11 PRIOR ART
FIG. 11 is a vertical sectional view showing a conventional disk driving motor and chucking mechanism.
Figure 12:
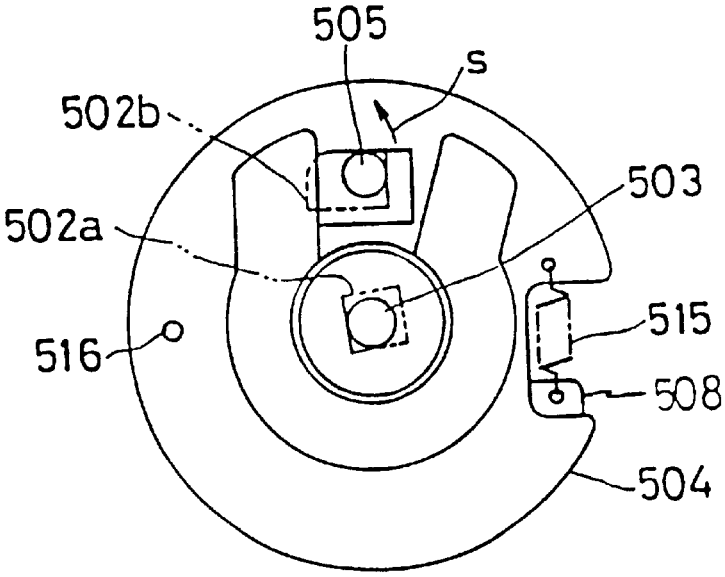
FIG. 12 PRIOR ART
FIG. 12 is an overhead plan view showing the conventional disk chucking mechanism.
Figure 13:
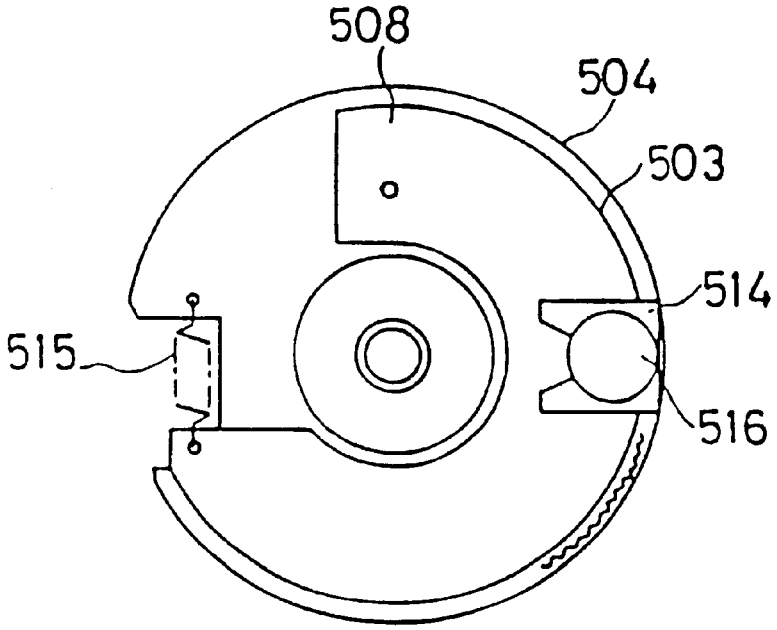
FIG. 13 PRIOR ART
FIG. 13 is a bottom view showing the conventional disk chucking mechanism.
Figure 14:
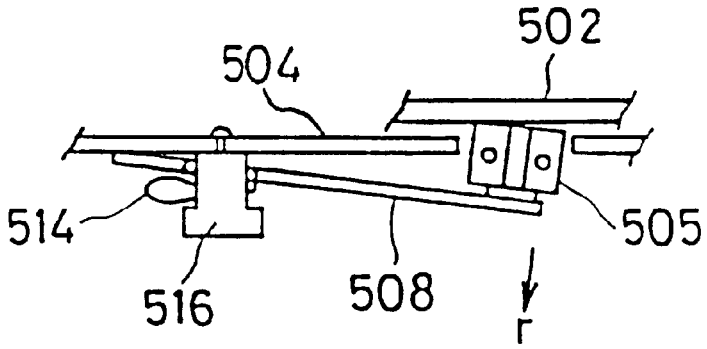
FIG. 14 PRIOR ART
FIG. 14 is a schematic sectional view showing a drive pin section of the conventional disk chucking mechanism.
Figure 15:
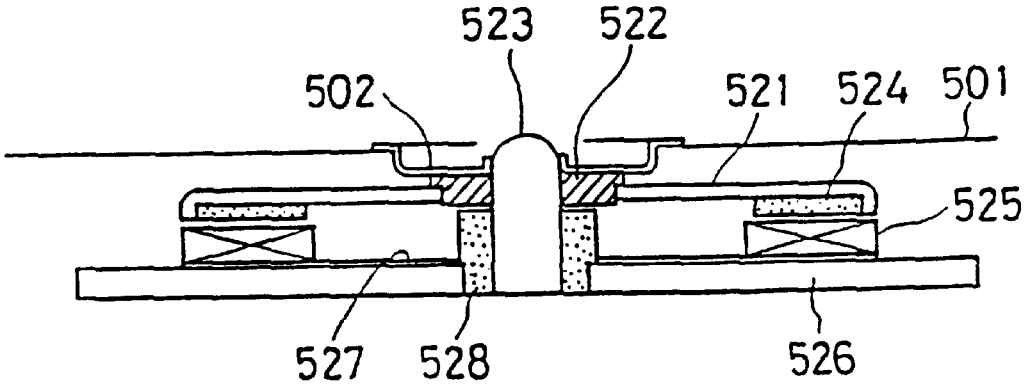
FIG.15 PRIOR ART
FIG. 15 is a vertical sectional view showing another conventional disk driving motor.

FIG. 10 is an exploded perspective view showing the spindle motor serving as the disk driving motor.

The spindle motor 40 corresponds to the spindle motor described above in FIGS. 5–9, and is disposed on the motor circuit board 24. The circuit board 24 is attached to a main frame 50 from below the lower shield casing 5 by three flush screws 29. No counter-sinking is performed on the motor circuit board 24, but holes whose diameter is slightly smaller than the head diameter of the flush screws 29 are bored in circuit board 24, this limiting the length of projection of the flush screws 29.

The main frame 50 also has the carriage for shiftably holding the recording/reproducing magnetic head (not shown), etc., assembled thereto. In the embodiment, the main frame 50 is made of plastic for the purpose of weight reduction in compliance with an increasing demand brought by the down-sizing of computers. In FIG. 10, reference numerals 51a and 51b designate shims for adjustment of the height of the main frame 50 relative to the spindle motor 40.

As described above, in a disk drive apparatus having the disk driving motor assembly according to the present invention, since the chucking lever 33 is provided on the rotary member 22 attached to the spindle 20, and the axial shifting of the drive pin 33a is prevented, a smaller space is required for the motor. Since the disengagement preventive lever portion 33c is provided adjacent to the pivot support portion 33d, the chucking lever can form a one piece disk chucking mechanism. Consequently, the total number of parts can be reduced, the efficiency of assembly work can be enhanced, and the size and thickness of the motor can be decreased. Accordingly, the size and thickness of the disk drive apparatus can be decreased.

If the rotor of the disk driving motor is used as the rotary member as in the preferred embodiment, the configuration can be simplified even further.

Further, by forming the circumferential groove in the spindle of the disk driving spindle motor, fitting the snap ring in the circumferential groove, and fitting the rotor of the spindle motor to the spindle and fixing it to the snap ring, the rotor can be reliably fixed to the spindle even though the axial length of the fitting section between the rotor and the spindle is short. Accordingly, the thickness and size of the disk drive apparatus can be decreased even more.

FIGS. 16–21 show modifications of the previously described embodiments that are within the scope of the invention.

Figure 16:
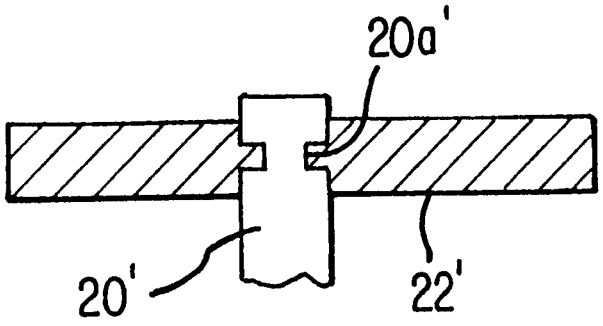
FIG. 16 is a cross-sectional view of a modification of the invention in which a rotary member is injection molded to a spindle.

FIG. 16 illustrates a modification where the rotary member 22' is injection molded to spindle 20'. Spindle 20' includes a groove 20' a around its outer circumference. The rotary member 22' is injection molded around the portion of spindle 20' that includes groove 20'a. This serves to securely attach rotary member 22' to spindle 20'.

Figure 17:
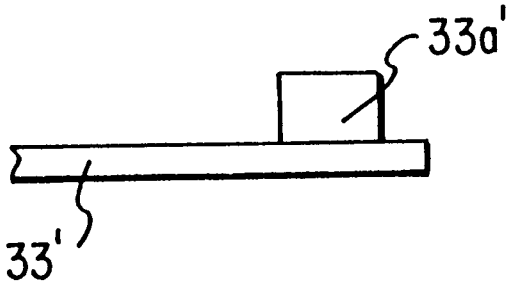
FIG. 17 is a side view of a modified chucking lever in which the drive pin is spaced from an extreme end of the chucking lever.
Figure 18:
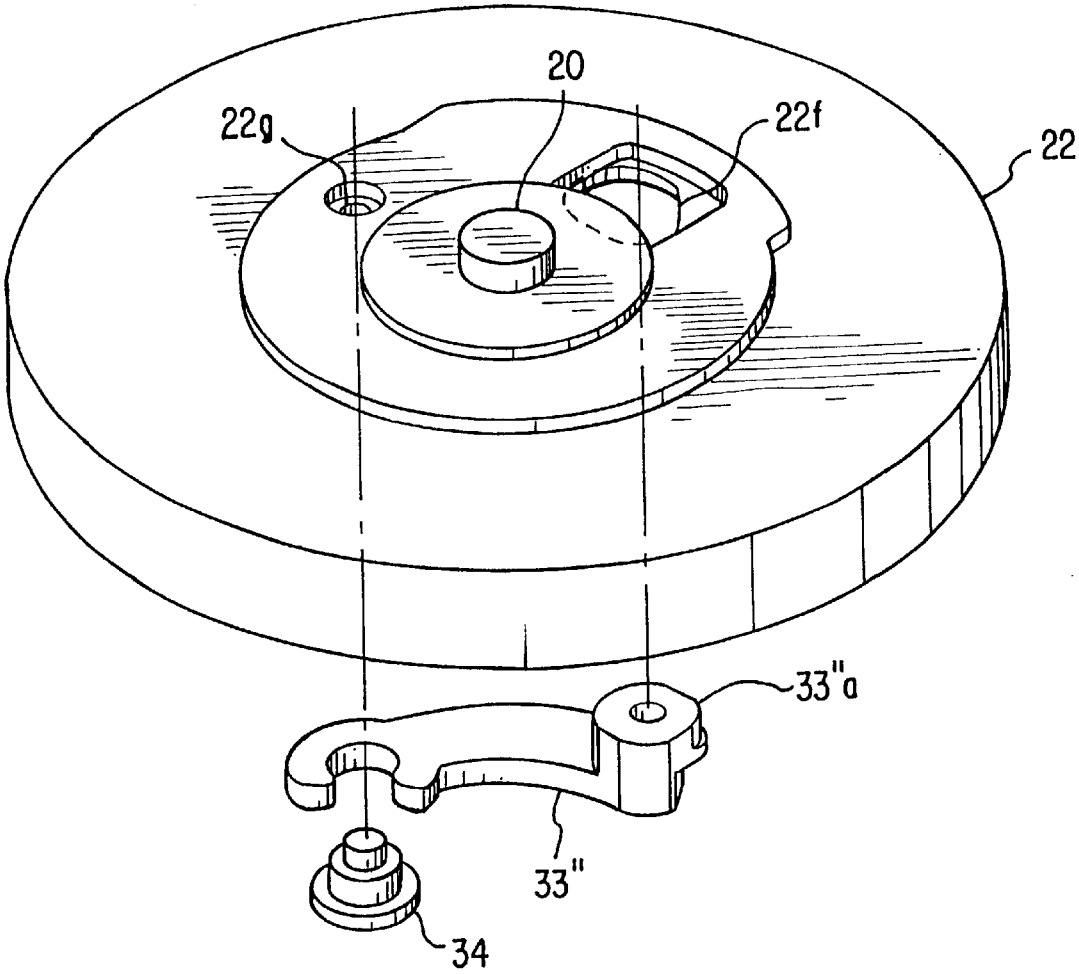
FIG. 18 is perspective, exploded view of another embodiment of the invention in which the chucking lever is mounted on a bottom surface of the rotary member, which is opposite from an upper surface of the rotary member that contacts the disk hub.

FIG. 17 illustrates a modification of the chucking lever. In particular, chucking lever 33' includes a drive pin 33'a that is spaced a small distance from the extreme end of lever 33'. Thus, similar to the embodiment illustrated in FIG. 5, the drive pin 33'a is located at or near an end of chucking lever 33'. However, unlike the drive pin 33a of FIG. 5, modified drive pin 33'a is not located at the extreme end of chucking lever 33'. The rest of chucking lever 33' is similar to the chucking lever 33 of FIG. 5, including the provision of slot 33b in drive pin 33'a.

Figure 19:
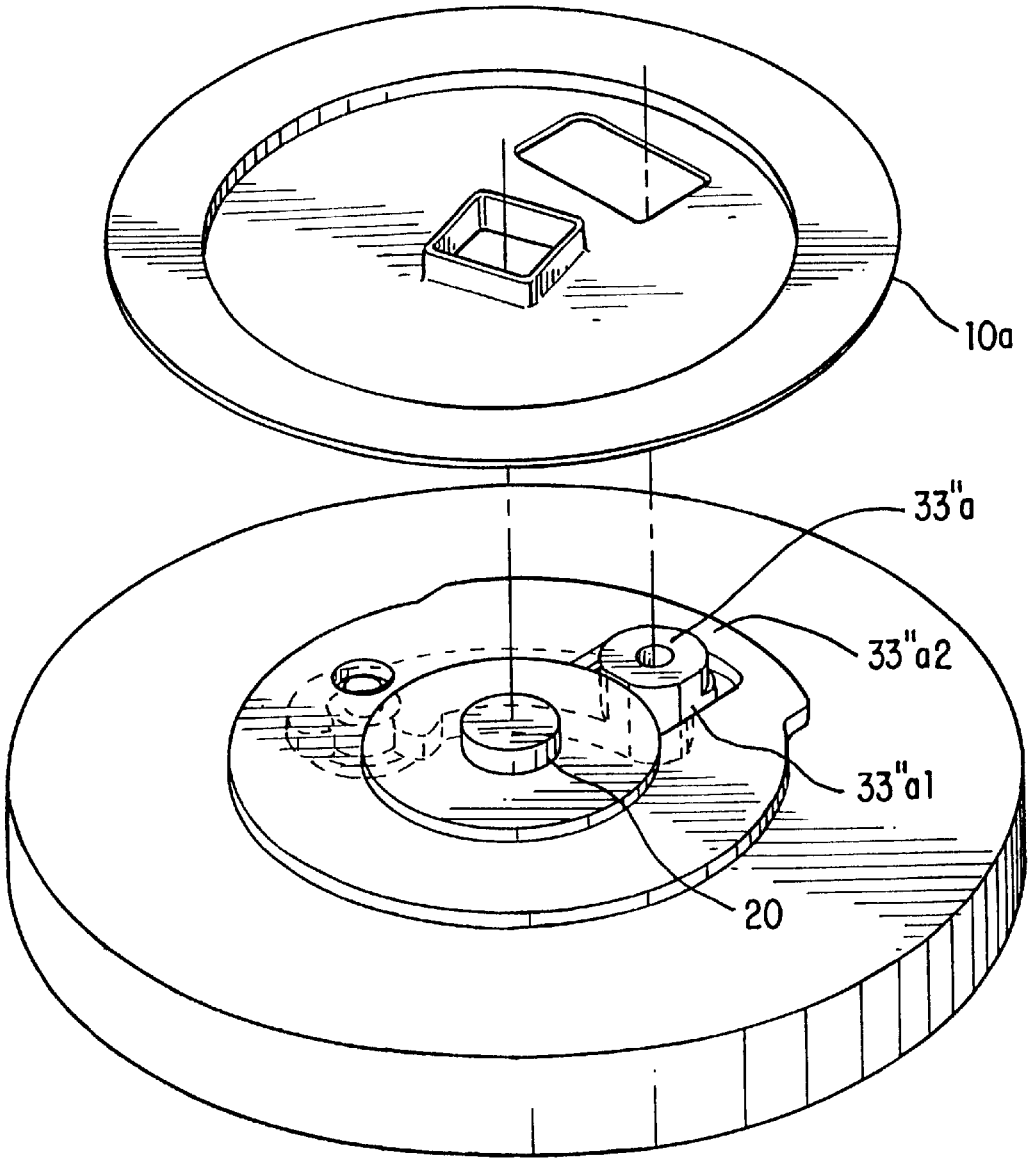
FIG. 19 is a perspective view of the FIG. 18 embodiment relative to a disk hub.
Figure 20:
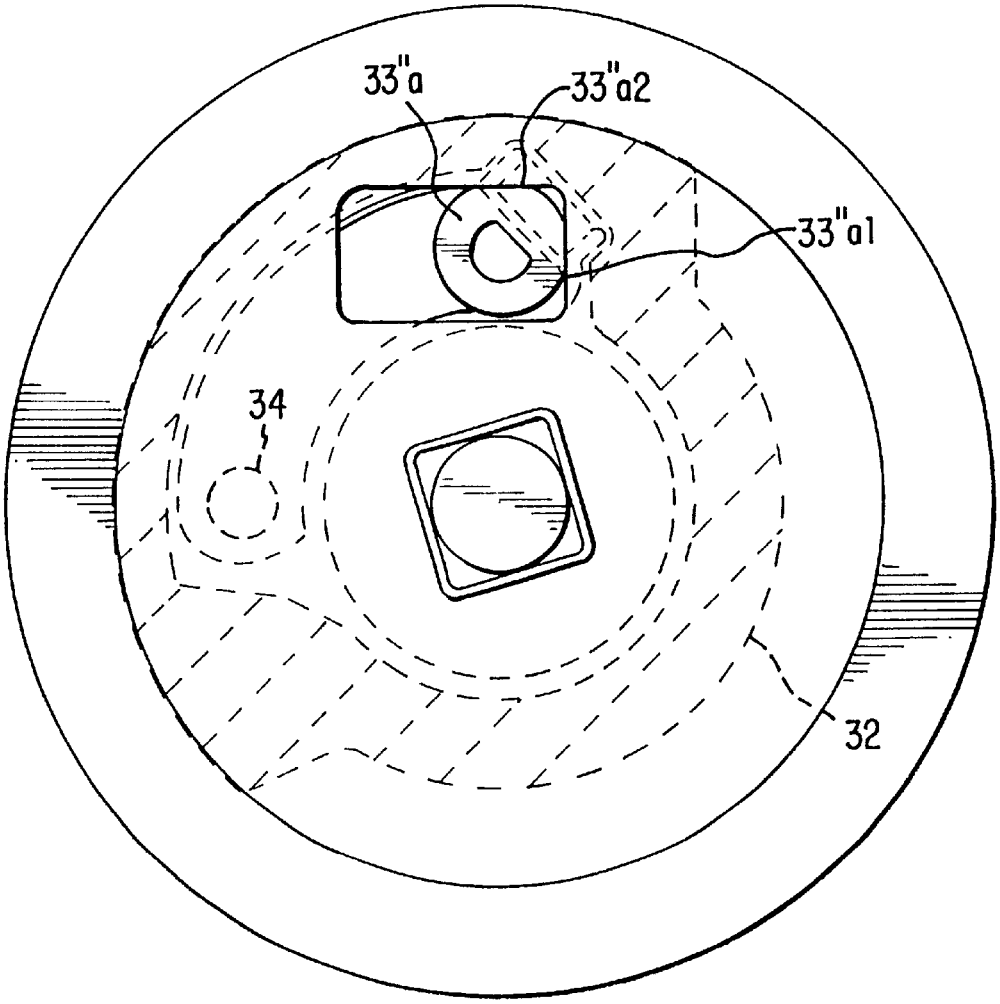
FIG. 20 is a plan view in which the disk hub is mounted on and engaged by the FIG. 18 embodiment.
Figure 21:
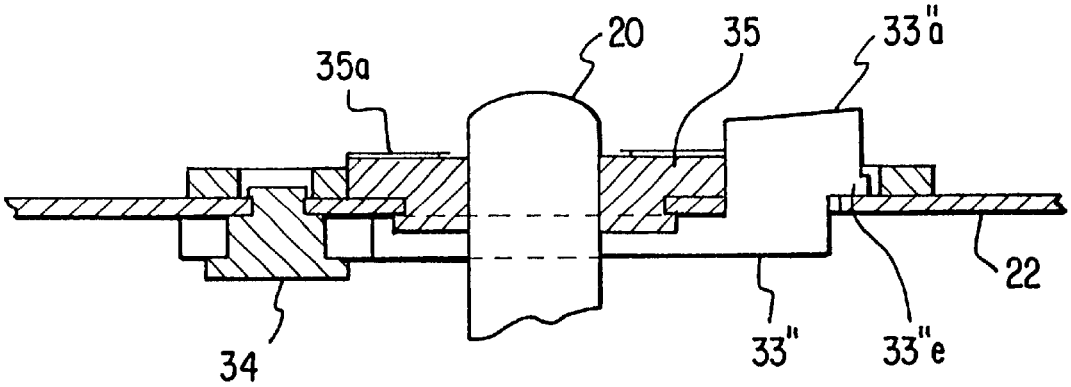
FIG. 21 is a side cross-sectional view of the FIG. 18 embodiment.

FIGS. 18–21 show an arrangement in which a chucking lever 33" is rotatably attached to a lower surface of a rotary member 22 by means of a pivot pin 34. A drive pin 33"a provided in the vicinity of one end of the chucking lever 33" extends through a hole 22f formed in the rotary member 22 so as to extend above the upper surface of the rotary member 22 as shown in FIGS. 19 and 21. The edges of hole 22f contact drive pin 33"a, limiting its movement in a direction perpendicular to the spindle axial direction. The pivot pin 34 also extends into and is attached to a pivot hole 22g formed in the rotary member 22.

The portion of the chucking lever 33" that engages with the pivot pin 34 has a C-like form, i.e., a partly cut-out circular form. This portion is guided by the pivot pin 34 so that the chucking lever is pivotally supported in a manner so that it is not movable in the direction of the axis of the spindle 20.

This chucking lever 33" is made of plastic (more specifically, a material prepared by mixing 10 to 40 wt % of potassium titanate filaments or fibers in polyacetal resin) so that it is a fiber reinforced plastic. By virtue of the C-shaped engaging portion, assembly of the chucking lever to the rotary member 22 may be done so that the chucking lever 33" is fitted on (i.e., snapped onto) the pivot pin 34 after the pivot pin 34 has been inserted in the hole 22g of the rotary member 22. It is of course possible to assemble the device in such a way that the pivot pin 34 is inserted and attached in hole 22g after the C-shaped portion of the chucking lever has been put into engagement with the pivot pin 34. In such a way of assembly, however, the insertion step is rather difficult to conduct because three parts have to be handled together at the time of insertion of pin 34 into hole 22g.

FIG. 19 is a perspective view of the structure in a state before a disk hub 10a (of a disk, not shown) is mounted on the chucking mechanism, and indicated how the disk hub 10a will be aligned to the chucking mechanism when disk hub 10a is finally located by the chucking mechanism.

FIG. 20 is a plan view of the arrangement in which the disk hub 10a has been mounted and finally located on the chucking mechanism. The chucking magnet 32 is shown in broken lines.

The drive pin 33"a engages with a drive hole located at an eccentricity from the central hole of the disk hub 10a. The spindle 20 engages with the central hole of the disk hub 10a. The drive hole in the disk hub 10a is formed by pressing or punching a magnetic stainless steel plate without any post-processing. Consequently, the drive pin 33"a, which is made of plastic and which engages with the drive hole, can become worn due to frictional engagement with the drive hole. The portions of the drive pin 33"a that are engageable with the drive hole in the disk hub 10a are therefore flattened as indicated by 33"a1 and 33"a2. It is possible to reduce the wear of the drive pin 33"a by increasing the area of contact between the drive pin 33"a and the disk hub 10a by flattening the portions of the drive pin 33"a as detailed above.

FIG. 21 is a cross-sectional view of the chucking mechanism. The chucking lever 33" is secured to the lower face of the rotary member 22 by means of the pivot pin 34 so as to be pivotal in a direction perpendicular to the axis of the spindle 20. It will be seen that the pivot pin 34 does not allow the chucking lever 33" to move in the direction of the axis of the spindle 20. A portion of the rotary member 22 engages within the lower face 33"e of the drive pin 33"a so as to prevent the drive pin 33"a from moving in the direction of the axis of the spindle 20 (i.e., in a downward direction in FIG. 21).

Obviously, any tendency of the chucking lever 33" to move upward brings the lower surface of the rotary member 22 into contact with the upper surface of the chucking lever 33", thereby preventing upward movement of the chucking lever 33".

The pivot pin 34 prevents movement of chucking lever 33" in the axial direction of the spindle 20 without covering or contacting substantially the entirety of the lower surface of the chucking lever 33". This differs from, and is less bulky than, the structure disclosed in U.S. Pat. No. 4,697,216, in which the entire upper and lower surfaces of the ring plate (which includes the drive pin) is contacted by opposing surfaces of the yoke plate and the turntable, which together constitute a rotary member of a disk drive apparatus. Thus, in both the embodiments of FIGS. 5 and 18, the rotary member 22 extends or substantially the entirety of only one side of the chucking lever 33, 33". Substantially the entirety of the other side of the chucking lever (i.e., the upper side of the chucking lever 33 and the lower side of chucking lever 33") is not covered by any structure that prevents the chucking lever from moving in the spindle axial direction. In each embodiment, a first disengagement preventative member of the chucking lever (i.e., lever 33c, or C-shaped portion of chucking lever 33") engages a second disengagement preventative member of the rotary member 22 (i.e., pawl 22d or pivot pin 34) to prevent movement of the chucking lever in the spindle axial direction.

In the illustrated construction of FIG. 21, the rotary member 22 is attached to a bush 34, which in turn is fixed to the spindle 20. The bus 35 is made of brass which facilitates the attachment as well as press-fitting on the spindle 20.

The upper face of the bush 35 provides a surface that receives the disk hub 10a. This surface is coated with a fluoro-resin as at 35a so as to attain low friction between the disk hub 10a and the bush 35.

While this invention has been described in conjunction with specific embodiments thereof, it is evident that many alternatives, modifications and variations will be apparent to those skilled in the art. For example, the features of the various different embodiments can be used with each other in various combinations. Accordingly, the preferred embodiments of the invention as set forth herein are intended to be illustrative, not limiting. Various changes may be made without departing from the spirit and scope of the invention as defined in the following claims.

What is claimed is:

1. In a disk driving motor having a rotatable spindle for insertion through a central hole of a disk hub of a disk which is to be rotated by the disk driving motor, the disk hub having a drive hole offset from the central hole, said disk driving motor comprising:

a rotary member attached to the spindle for rotation with the spindle; and a chucking mechanism including: a chucking lever, said chucking lever pivotally attached to said rotary member for limited movement parallel to a plane containing a portion of a surface of said rotary member that contacts the disk hub, but no movement perpendicular to said plane; a drive pin located near one end of said chucking lever and extending perpendicular to said plane beyond said portion of the surface of said rotary member that contacts the disk hub; said chucking lever including a first disengagement preventative member;

said rotary member including a second disengagement preventive member engaged with said first disengagement preventative member so as to prevent said chucking lever from disengaging from said rotary member.

2. The motor of claim 1, wherein said one end of said chucking lever is a first end of said chucking lever, said chucking lever also having a second end, and said chucking lever is pivotally attached to said rotary member betwen said first and second ends.

3. The motor of claim 1, further comprising:

means for forcing the disk toward said surface of said rotary member.

4. The motor of claim 3, wherein said means for forcing is a chucking magnet[ic], attached to said surface of said rotary member, for magnetically attracting the disk hub.

5. The motor of claim 4, wherein said chucking magnet is annular and includes a radially inner edge and a radially outer edge, and said chucking lever is located radially within the radially inner edge of said chucking magnet.

6. The motor of claim 4, wherein a first surface of said chucking magnet is attached to said rotary member, and a second surface of said chucking magnet[ic], facing opposite from said first surface, has a low coefficient of friction.

7. The motor of claim 6, wherein said portion of the surface of said rotary member which contacts the disk hub has a low coefficient of friction.

8. The motor of claim 1, wherein said portion of the surface of said rotary member which contacts the disk hub has a low coefficient of friction.

9. The motor of claim 1, wherein said rotary member is a rotor of said motor, and includes a magnetic portion for co-acting with a stator to cause said rotor and spindle to rotate.

10. The motor of claim 9, wherein said rotor is an iron plate having a thickness of about 0.5 mm.

11. The motor of claim 1, wherein said drive pin extends beyond said portion of said surface of said rotary member which contacts the disk hub by no more than 0.7 mm.

12. The motor of claim 1, wherein a planar surface of said drive pin extends in a plane which is at an angle of 2°±1.5° to a plane containing said portion of said surface of said rotary member which contacts the disk hub.

13. The motor of claim 1, wherein said drive pin includes a groove, slidably engaged with a guide portion of said rotary member, for permitting said pin to move parallel to, but not perpendicular to, said plane containing said portion of said surface of said rotary member which contacts the disk hub.

14. The motor of claim 1, wherein said first disengagement preventive member is a disengagement preventive lever unitary with said chucking lever, and said second disengagement preventative member is a pawl attached to said rotary member and engaged with said disengagement preventing lever.

15. The motor of claim 14, wherein said pawl is unitary with said rotary member.

16. The motor of claim 1, further comprising a first engagement structure located at said one end of said chucking lever, and a second engagement structure located on said rotary member, said first and second engagement structures engaging each other and permitting said chucking lever to move parallel to said plane while preventing said chucking lever from moving perpendicular to said plane.

17. The motor of claim 16, wherein said first engagement structure is located at said drive pin.

18. The motor of claim 1, wherein said rotary member includes a slot, said chucking lever extends over said slot and protrudes into said slot, so that said slot limits said movement of said chucking lever parallel to said plane by contact of said chucking lever with edges of said slot.

19. The motor of claim 1, wherein an outer surface of said spindle includes a groove, and said rotary member is injection molded around said spindle so that portions of said rotary member extend into said groove of said spindle.

20. The motor of claim 1, wherein said drive pin is spaced from said one end of said chucking lever.

21. The motor of claim 1, wherein said chucking lever is pivotally attached to a side of said rotary member opposite from said portion of the surface of said rotary member that contacts the disk hub, said drive pin extending through an aperture in said rotary member beyond said portion of the surface of said rotary member that contacts the disk hub.

22. A disk driving motor assembly for use in a disk drive apparatus, for rotating a disk having a disk hub with a central hole and a drive hole offset from the central hole, said disk driving motor assembly comprising:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin located near one end of said chucking lever for engagement with the drive hole in the disk hub;

said rotary member having a slot extending through a portion of said planar surface, said chucking lever extending over and permanently protruding into said slot so that edges of said slot limit movement of said chucking lever in a direction perpendicular to an axial direction of said spindle;

wherein when said drive pin of said chucking lever is not engaged with the drive hole of the disk, the chucking lever is pivotal about a pivot support point within a given angle but is prevented from shifting in said axial direction of said spindle, said chucking lever being provided with a disengagement preventive mechanism engaged with said rotary member to prevent said chucking lever from separating from said rotary member.

23. The disk drive motor assembly of claim 22, wherein said rotary member is a rotor of a spindle motor for rotating the disk, and includes a magnetic portion for co-acting with a stator to cause said rotor and spindle to rotate.

24. The disk driving motor assembly of claim 22, further comprising a chucking magnet provided on said planar surface of said rotary member for magnetically attracting the disk hub.

25. The disk driving motor assembly of claim 22, wherein an outer surface of said spindle includes a groove, and said rotary member is injection molded around said spindle so that portions of said rotary member extend into said groove of said spindle.

26. The disk driving motor assembly of claim 22, wherein said drive pin is spaced from said one end of said chucking lever.

27. The disk driving motor assembly of claim 22, wherein said drive pin extends through said slot.

28. A disk drive apparatus for performing signal recording and reproducing on a disk accommodated in a cartridge, said disk having a disk hub with a central hole and a drive hole offset from the central hole, said disk drive apparatus having a disk drive motor assembly including:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin near one end of said chucking lever for engagement with the drive hole in the disk hub;

said rotary member having a slot extending through a portion of said planar surface, said chucking lever extending over and permanently protruding into said slot so that edges of said slot limit movement of said chucking lever in a direction perpendicular to an axial direction of said spindle;

wherein when said drive pin of said chucking lever is not engaged with the drive hole of the disk, the chucking lever is pivotal about a pivot support point within a given angle but is prevented from shifting in said axial direction of said spindle, said chucking lever being provided with a disengagement preventive mechanism engaged with said rotary member to prevent said chucking lever from separating from said rotary member.

29. A disk drive apparatus for performing a signal recording said reproducing on a disk accommodated in a cartridge, said disk having a disk hub with a central hole and a drive hole offset from the central hole, said disk drive apparatus having a disk drive motor including:

a rotary member attached to the spindle for rotation with the spindle; and a chucking mechanism including: a chucking lever, said chucking lever pivotally attached to said rotary member for limited movement parallel to a plane containing a portion of a surface of said rotary member that contacts the disk hub, but no movement perpendicular to said plane; a drive pin located near one end of said chucking lever and extending perpendicular to said plane beyond said portion of the surface of said rotary member that contacts the disk hub; said chucking lever including a first disengagement preventative member;

said rotary member including a second disengagement preventative member engaged with said first disengagement preventative member so as to prevent said chucking lever from disengaging from said rotary member.

30. A disk driving motor assembly for use in a disk drive apparatus, for rotating a disk having a disk hub with a central hole and a drive hole offset from the central hole, said disk driving motor assembly comprising:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin located near one end of said chucking lever for engagement with the drive hole in the disk hub;

wherein when said drive pin of said chucking lever is not engaged with the drive hole of the disk, the chucking lever is pivotal about a pivot support point within a given angle but is prevented from shifting in an axial direction of said spindle, said chucking lever being provided with a disengagement preventive mechanism engaged with said rotary member to prevent said chucking lever from separating from said rotary member, without the need for a separate clamp extending over substantially the entire surface of said chucking lever.

31. The disk drive motor assembly of claim 30, wherein said disengagement preventative mechanism includes a disengagement preventative projection on said chucking lever that is engageable with said rotary member to prevent said chucking lever from separating from said rotary member in said axial direction of said spindle.

32. The disk drive motor assembly of claim 30, wherein said rotary member has a slot extending through a portion of said planar surface, said chucking lever extending over and permanently protruding into said slot so that edges of said slot limit movement of said chucking lever in a direction perpendicular to said axial direction of said spindle.

33. The disk drive motor assembly of claim 30, wherein said chucking lever is pivotally attached to a side of said rotary member opposite from a portion of the surface of said rotary member that contacts the disk hub, said drive pin extending through an aperture in said rotary member beyond said portion of the surface of said rotary member that contacts the disk hub so that contact between edges of said aperture and said drive pin limits movement of said chucking lever in a direction perpendicular to said axial direction of said spindle.

34. A disk driving motor assembly for use in a disk drive apparatus, for rotating a disk having a disk hub with a central hole and a drive hole offset from the central hole, said disk driving motor assembly comprising:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin located near one end of said chucking lever for engagement with the drive hole in the disk hub, said rotary member extending over substantially the entirety of only one side of said chucking lever;

wherein when said drive pin of said chucking lever is not engaged with the drive hole of the disk, the chucking lever is pivotal about a pivot support point within a given angle but is prevented from shifting in an axial direction of said spindle, said chucking lever being provided with a disengagement preventative mechanism engaged with said rotary member to prevent said chucking lever from separating from said rotary member.

35. The disk drive motor assembly of claim 34, wherein said disengagement preventative mechanism includes a disengagement preventative projection on said chucking lever that is engageable with said rotary member to prevent said chucking lever from separating from said rotary member in said axial direction of said spindle.

36. The disk drive motor assembly of claim 34, wherein said rotary member has a slot extending through a portion of said planar surface, said chucking lever extending over and permanently protruding into said slot so that edges of said slot limit movement of said chucking lever in a direction perpendicular to said axial direction of said spindle.

37. The disk drive motor assembly of claim 34, wherein said chucking lever is pivotally attached to a side of said rotary member opposite from a portion of the surface of said rotary member that contacts the disk hub, said drive pin extending through an aperture in said rotary member beyond said portion of said the surface of said rotary member that contacts the disk hub so that contact between edges of said aperture and said drive pin limits movement of said chucking lever in a direction perpendicular to said axial direction of said spindle.

38. A disk driving motor assembly for use in a disk drive apparatus, for rotating a disk having a disk hub with a central hole and a drive hole offset from the central hole, said disk driving motor assembly comprising:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin located near one end of said chucking lever for engagement with the drive hole in the disk hub;

wherein when said drive pin of said chucking lever is not engaged with the drive hole of the disk, the chucking lever is pivotal about a pivot support point within a given angle but is prevented from shifting in an axial direction of said spindle, said chucking lever including a disengagement preventive projection engageable with said rotary member to prevent said chucking lever from separating from said rotary member in said axial direction.

39. The disk drive motor assembly of claim 38, wherein said rotary member has a slot extending through a portion of said planar surface, said chucking lever extending over and permanently protruding into said slot so that edges of said slot limit movement of said chucking lever in a direction perpendicularly to said axial direction of said spindle.

40. A disk drive apparatus for performing signal recording and reproducing on a disk accommodated in a cartridge, said disk having a disk hub with a central hole and a drive hole offset from the central hole, said disk drive apparatus having a disk drive motor assembly, including:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin located near one end of said chucking lever for engagement with the drive hole in the disk hub;

wherein when said drive pin of said chucking lever is not engaged with the drive hole of the disk, the chucking lever is pivotal about a pivot support point within a given angle but is prevented from shifting in an axial direction of said spindle, said chucking lever being provided with a disengagement preventive mechanism engaged with said rotary member to prevent said chucking lever from separating from said rotary member, without the need for a separate clamp extending over substantially the entire surface of said chucking lever.

41. A disk drive apparatus for performing signal recording and reproducing on a disk accommodated in a cartridge, said disk having a disk hub with a central hole and a drive hole offset from the central hole, said disk drive apparatus having a disk drive motor assembly comprising:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin located near one end of said chucking lever for engagement with the drive hole in the disk hub, said rotary member extending over substantially the entirety of only one side of said chucking lever;

wherein when said drive pin of said chucking lever is not engaged with the drive hole of the disk, the chucking lever is pivotal about a pivot support point within a given angle but is prevented from shifting in an axial direction of said spindle, said chucking lever being provided with a disengagement preventative mechanism engaged with said rotary member to prevent said chucking lever from separating from said rotary member.

42. A disk drive apparatus for performing signal recording and reproducing on a disk accommodated in a cartridge, said disk having a disk hub with a central hole and a drive hole offset from the central hole, said disk drive apparatus having a disk drive motor assembly including:

a spindle for engagement with the central hole of the disk hub;

a rotary member fixed to said spindle for rotation of said rotary member with said spindle, said rotary member having a planar surface;

a chucking lever pivotally provided on said planar surface of said rotary member, and having a drive pin located near one end of said chucking lever for engagement with the drive hole in the disk hub;

wherein when said drive pin of said chucking lever is not engaged with the drive hole of the disk, the chucking lever is pivotal about a pivot support point within a given angle but is prevented from shifting in an axial direction of said spindle, said chucking lever including a disengagement preventive projection engageable with said rotary member to prevent said chucking lever from separating from said rotary member in said axial direction.

*43. A disk drive apparatus for performing signal recording and reproducing on a disk accommodated in a cartridge, said disk having a disk hub with a central hole and a drive hole offset from the central hole, said disk drive apparatus having a disk drive motor including:*

*a rotary member attached to a spindle for rotation with the spindle; and*

*a chucking mechanism including a drive pin movable with respect to a surface of said rotary member that contacts the disk hub, said drive pin moving radially in a plane of the rotary member but not moving perpendicular to said plane, said drive pin extending perpendicular to said plane beyond said portion of the surface of said rotary member that contacts the disk hub, said drive pin including a disengagement preventative member that prevents said drive pin from moving relative to said rotary member in a direction perpendicular to said plane.*

*44. The disk drive apparatus of claim 43, wherein a height of the drive pin from an uppermost surface of the rotary member to an uppermost surface of the drive pin is no more than 0.7 mm.*

*45. The disk drive apparatus of claim 43, further comprising a chucking magnet including a first surface attached to said rotary member and a second surface, facing opposite from said first surface, having a low coefficient of friction.*

*46. The disk drive apparatus of claim 43, further comprising an annular chucking magnet including a radial inner edge and a radial outer edge, said drive pin being located radially within the radial inner edge of the chucking magnet.*

*47. The disk drive apparatus of claim 43, further comprising a chucking magnet provided on the rotary member and positioned relative to the drive pin such that when a portion of the disk hub rests on top of the drive pin, a diametrically opposed portion of the disk hub rests on a portion of the chucking magnet.*

*48. The disk drive apparatus of claim 43, wherein the drive pin is made from plastic material.*

*49. The disk drive apparatus of claim 43, further comprising a holder positioned adjacent said chucking mechanism, said holder receiving and holding the cartridge between raised and lowered positions.*

*50. The disk drive apparatus of claim 43, further comprising an elongate member attached to the rotary member, said drive pin being attached to the elongate member near an end of the elongate member.*

*51. A disk drive apparatus for performing signal recording and reproducing on a disk accommodated in a cartridge, said disk having a disk hub with a central hole and a drive hole offset from the central hole, said disk drive apparatus having a disk drive motor including:*

*a spindle;*

*a rotary member fixed to the spindle for rotation with the spindle;*

*a chucking mechanism including a drive pin provided to the rotary member and extending away from a surface of the rotary member that contacts the disk hub, said*

*drive pin having a planar surface that contacts the disk hub during chucking, said drive pin planar surface extending in a plane that is inclined with respect to a plane containing said surface of said rotary member that contacts the disk hub.*

*52. The disk drive apparatus of claim 51, wherein the drive pin is made from plastic material.*

*53. The disk drive apparatus of claim 52, further comprising a plastic chucking lever attached to said rotary member, said drive pin being attached to said plastic chucking lever.*

*54. The disk drive apparatus of claim 51, further comprising a holder positioned adjacent said chucking mechanism, said holder receiving and holding the cartridge between raised and lowered positions.*

*55. The disk drive apparatus of claim 51, wherein said drive pin is attached to said rotary member for limited movement parallel to, but no movement perpendicular to a plane containing said portion of said surface of said rotary member that contacts said disk hub.*

*56. The disk drive apparatus of claim 51, wherein the drive pin moves radially in a plane of the rotary member, but not perpendicular to said surface of said rotary member.*

* * * * *